United States Patent Office 3,338,927
Patented Aug. 29, 1967

3,338,927
(OPTIONALLY 17-ALKYLATED) 3α-OXYGENATED
1α-SULFONATED 5α-ANDROSTAN-17β-OLS AND
ESTERS THEREOF
Paul D. Klimstra, Northbrook, Ill., assignor to G. D. Searle & Co., Chicago, Ill., a corporation of Delaware
No Drawing. Filed Nov. 26, 1965, Ser. No. 510,036
6 Claims. (Cl. 260—397.4)

The present invention is concerned with novel steroidal derivatives characterized by a 1α-sulfo substituent and, more particularly, with (optionally 17-alkylated) 3-oxygenated 1α-sulfonated 5α-androstan-17β-ols and esters corresponding which are represented by the following structural formula

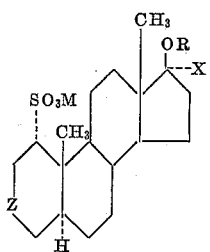

wherein R is hydrogen or a lower alkanoyl radical, X is hydrogen or a lower alkyl radical, Z is a carbonyl or β-hydroxymethylene radical and M is hydrogen or a metallic cation.

The lower alkyl radicals represented in the foregoing structural formula are exemplified by methyl, ethyl, propyl, butyl, pentyl, hexyl, heptyl, and the branched-chain groups isomeric therewith.

Typical of the lower alkanoyl radicals depicted in the foregoing representation are formyl, acetyl, propionyl, butyryl, valeryl, caproyl, heptanoyl and the branched-chain isomers thereof.

The metallic cations represented by M are exemplified by sodium, potassium, lithium, calcium and magnesium.

The compounds of this invention are conveniently obtained by processes utilizing as starting materials compounds of the following structural formula

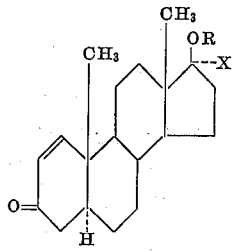

wherein R and X are as above defined. The reaction of those starting materials with a metallic bisulfite or metabisulfite thus affords the corresponding 1α-sulfonated derivative as the sulfonate salt. As a specific example, 17β-hydroxy-17α-methyl-5α-androst-1-en-3-one in ethanol is heated with an aqueous solution of sodium bisulfite, thus producing sodium 17β-hydroxy-17α-methyl-1α-sulfo-5α-androstan-3-one.

The sulfonate salts of the present invention are alternatively produced by reaction of a sulfonate salt, produced as described above, with an inorganic salt or base containing the desired cation. Reaction of the aforementioned sodium 17β - hydroxy-17α-methyl-1α-sulfo-5α-androstan-3-one with calcium oxide thus produces the corresponding calcium salt.

Reaction of the instant sulfonates salts with a mineral acid affords the corresponding free sulfonic acid. When sodium 17β-hydroxy-17α-methyl-1α-sulfo-5α-androstan-3-one is contacted with sulfuric acid, there is accordingly produced 17β-hydroxy-17α-methyl-1α-sulfo-5α-androstan-3-one.

The 3β-hydroxy compounds of this invention are conveniently produced by reduction of the corresponding 3-keto derivatives. Reaction of 17β-hydroxy-17α-methyl-1α-sulfo-5α-androstan-3-one with lithium tri-(tertiary-butoxy) aluminum hydride in tetrahydrofuran thus affords 17α-methyl-1α-sulfo-5α-androstane-3β,17β-diol.

An alternate procedure for manufacture of the instant 17-(lower alkanoyl)oxy compounds involves esterification of the corresponding 17-hydroxy substances. As a specific example, 17β-hydroxy-1α-sulfo-5α-androstan-3-one is contacted with acetic anhydride and pyridine to afford 17β-acetoxy-1α-sulfo-5α-androstan-3-one.

The compounds of this invention display valuable pharmacological properties. They are hormonal and anti-hormonal agents, for example, as is evidenced by their anabolic, androgenic and anti-estrogenic activity. They are also inhibitors of the enzymatic action of pepsin. In addition, these compounds are anti-bacterial and anti-protozoal agents in consequence of their ability to inhibit the growth of such organisms as *Diplococcus pneumoniae* and *Tetrahymena gelleii*.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees centigrade (° C.) and quantities of materials in parts by weight unless otherwise noted.

Example 1

To a refluxing solution of 5 parts of 17β-hydroxy-17α-methyl-5α-anrdost-1-en-3-one in 48 parts of ethanol is added, with stirring over a period of about 90 minutes, a solution of 1.75 parts of sodium bisulfite in 25 parts of water. Refluxing of the mixture is continued for about 90 minutes longer, and the organic solvent is removed by distillation under reduced pressure. Addition of methanol to the resulting aqueous solution results in precipitation of a finely divided solid, which is collected by filtration, then washed successively with ethanol and dry ether to afford the crude product. That material is purified by recrystallization from methanol-acetone to afford sodium 17β - hydroxy - 17α - methyl-1α-sulfo-5α-androstan-3-one, melting at about 195–196°. This compound is represented by the following structural formula

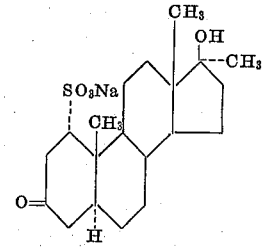

Example 2

When an equivalent quantity of 17α-ethyl-17β-hydroxy-5α-androst-1-en-3-one is substituted in the procedure of Example 1, there is produced sodium 17α-ethyl-17β-hydroxy-1α-sulfo-5α-androstan-3-one.

Example 3

To a refluxing solution of 14.4 parts of 17β-hydroxy-5α-androst-1-en-3-one in 144 parts of ethanol is added, dropwise over a period of about 1½ hours, a solution of 5.2 parts of sodium bisulfite in 75 parts of water. The resulting reaction mixture is heated at the reflux temperature for about 2 hours longer, then is distilled under reduced pressure in order to remove the organic solvent. Dilution of the resulting aqueous solution with approximately 400 parts of acetone results in precipitation of the crude product, which is isolated by filtration, then washed successively with acetone and hexane and dried under reduced pressure. Recrystallization of that material from aqueous methanol affords pure sodium 17β-hydroxy-1α-sulfo-5α-androstan-3-one, melting at about 216–219° and exhibiting an optical rotation of +65.5°.

Example 4

A mixture of one part of sodium 17β-hydroxy-17α-methyl-1α-sulfo-5α-androstan-3-one with 36 parts of tetrahydrofuran is heated to effect solution, then is cooled to 0–5°. To that mixture is then added a solution of 3 parts of lithium tri-(tertiary-butoxy) aluminum hydride in 18 parts of tetrahydrofuran, and the resulting reaction mixture is stirred for about one hour, then is poured into a mixture of ice and water containing approximately 35 parts by volume of 10% acetic acid. The resulting acidic mixture is allowed to stand at room temperature for about 16 hours, then is concentrated to dryness under reduced pressure. The resulting gummy white material is dissolved in hot methanol, then is neutralized by the addition of 10% aqueous sodium hydroxide. The insoluble salts are removed by filtration, and the filtrate is evaporated to dryness under reduced pressure. The residue thus obtained is slurried with warm water, and that slurry is neutralized by the addition of hydrochloric acid. The precipitate thus formed is isolated by filtration and dried in air to afford sodium 17α-methyl-1α-sulfo-5α-androstane-3β,17β-diol.

Example 5

When an equivalent quantity of sodium 17α-ethyl-17β-hydroxy-1α-sulfo-5α-androstan-3-one is substituted in the procedure of Example 4, there is obtained sodium 17α-ethyl-1α-sulfo-5α-androstane-3β,17β-diol.

Example 6

The substitution of an equivalent quantity of sodium 17β-hydroxy-1α-sulfo-5α-androstan-3-one in the procedure of Example 4 affords sodium 1α-sulfo-5α-androstane-3β,17β-diol.

Example 7

A mixture containing one part of sodium 17β-hydroxy-1α-sulfo-5α-androstan-3-one, 4 parts of pyridine and 8 parts of acetic anhydride is kept at room temperature for about 16 hours, then is poured into water to afford a clear solution. Evaporation of that solution to dryness under reduced pressure affords an oil, which solidifies upon standing. Purification by recrystallization from methanol-ether affords pure sodium 17β-acetoxy-1α-sulfo-5α-androstan-3-one, melting at about 187–191°.

Example 8

When an equivalent quantity of propionic anhydride is substituted in the procedure of Example 7, there is produced sodium 17β-propionoxy-1α-sulfo-5α-androstan-3-one.

Example 9

When an equivalent quantity of sodium 17β-acetoxy-1α-sulfo-5α-androstan-3-one is substituted in the procedure of Example 4, there is produced sodium 1α-sulfo-5α-androstane-3β,17β-diol 17 acetate.

Example 10

By substituting an equivalent quantity of sodium 17β-propionoxy-1α-sulfo-5α-androstan-3-one and otherwise proceeding according to the processes described in Example 4, there is produced sodium 1α-sulfo-5α-androstane-3β,17β-diol 17-propionate.

What is claimed is:
1. A compound of the formula

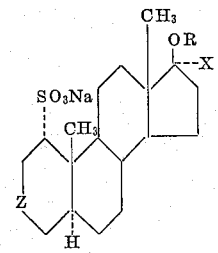

wherein R is a member of the class consisting of hydrogen and a lower alkanoyl radical, X is selected from the group consisting of hydrogen and a lower alkyl radical and Z is a member of the class consisting of a carbonyl and a β-hydroxymethylene radical.

2. As in claim 1, a compound of the formula

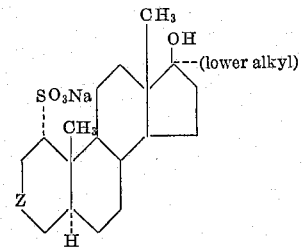

wherein Z is a member of the class consisting of a carbonyl and a β-hydroxymethylene radical.

3. As in claim 1, the compound which is sodium 17β-hydroxy-17α-methyl-1α-sulfo-5α-androstan-3-one.

4. As in claim 1, the compound which is sodium 17β-hydroxy-1α-sulfo-5α-androstan-3-one.

5. As in claim 1, the compound which is sodium 17α-methyl-1α-sulfo-5α-androstane,3β,17β-diol.

6. As in claim 1, the compound which is sodium 17β-acetoxy-1α-sulfo-5α-androstan-3-one.

References Cited

UNITED STATES PATENTS

| | | | |
|---|---|---|---|
| 2,567,268 | 9/1951 | Beall | 260—397.4 |
| 2,833,792 | 5/1958 | Dodson | 260—397.4 |
| 2,851,454 | 9/1958 | Pappo et al. | 260—239.55 |
| 3,118,916 | 1/1964 | Goedicke | 260—397.4 |
| 3,163,578 | 12/1964 | Bruckner et al. | 167—74 |
| 3,252,930 | 5/1966 | Smith et al. | 260—239.55 |

LEWIS GOTTS, *Primary Examiner.*

ELBERT L. ROBERTS, *Examiner.*

T. M. MESHBESHER, *Assistant Examiner.*